(12) United States Patent
Suzuki

(10) Patent No.: US 6,446,748 B1
(45) Date of Patent: Sep. 10, 2002

(54) REAR WHEEL SUPPORT FOR ATV

(75) Inventor: Takehito Suzuki, Shizuoka (JP)

(73) Assignee: Yamaha Hatsudoki Kabushiki Kaisha (JP)

( * ) Notice: Subject to any disclaimer, the term of this patent is extended or adjusted under 35 U.S.C. 154(b) by 0 days.

(21) Appl. No.: 09/841,828

(22) Filed: Apr. 25, 2001

(30) Foreign Application Priority Data

Apr. 27, 2000 (JP) ........................................ 2000-128532

(51) Int. Cl.⁷ ................................................ B60K 17/00
(52) U.S. Cl. ........................ 180/350; 180/312; 180/357; 280/124.116; 280/124.179
(58) Field of Search ................................ 180/350, 351, 180/357, 217, 312, 227, 231, 358, 348; 280/124.116, 124.179, 124.129

(56) References Cited

U.S. PATENT DOCUMENTS

| 4,469,188 | A | * | 9/1984 | Mita ........................... 180/215 |
| 4,540,061 | A | | 9/1985 | Watanabe |
| 4,606,429 | A | * | 8/1986 | Kurata ........................ 180/292 |
| 5,845,918 | A | * | 12/1998 | Grinde et al. ............. 280/124.1 |
| 5,960,902 | A | * | 10/1999 | Mancini et al. ............. 180/227 |
| 6,250,415 | B1 | | 6/2001 | Seto |
| 6,286,619 | B1 | | 9/2001 | Uchiyama et al. |
| 6,305,487 | B1 | * | 10/2001 | Montague .................... 180/348 |
| 6,364,041 | B1 | * | 4/2002 | Vangsgard ................ 180/24.12 |
| 6,364,048 | B1 | * | 4/2002 | McComber .................. 180/350 |

FOREIGN PATENT DOCUMENTS

NL  0102756  * 10/1962  .................. 180/350

OTHER PUBLICATIONS

Parts Catalogue, Model Year 1999, YFZ350L.
Parts Catalogue, Model Year 1999, YFS200L.
Parts Catalogue, Model Year 2001, YFM660RN.

* cited by examiner

Primary Examiner—Paul N. Dickson
Assistant Examiner—Toan C To
(74) Attorney, Agent, or Firm—Knobbe, Martens, Olson & Bear, LLP

(57) ABSTRACT

A recreational all terrain vehicle has a set of rear wheels attached to a frame assembly with a swing arm. The rear wheels are driven by a flexible transmitter, such as a chain. To tension the chain, a pair of laterally extending bolts are loosened while a generally longitudinally extending member is adjusted to move an axle associated with the rear wheels. The housing portion of the swing arm that receives the axle is substantially enclosed.

25 Claims, 6 Drawing Sheets

REAR WHEEL SUPPORT FOR ATV

RELATED APPLICATIONS

This application is related to and claims the priority of Japanese Patent Application No. 2000-127,183, which was filed on Apr. 27, 2000, the entire contents of which is hereby expressly incorporated by reference.

BACKGROUND OF THE INVENTION

1. Field of the Invention

The present invention generally relates mounting arrangements for rear axles of land vehicles. More particularly, the present invention relates to such mounting arrangements in three or four wheel vehicles, such as all terrain vehicles (ATVs).

2. Description of the Related Art

Recreational all terrain vehicles generally comprise a frame that is carried by at least one front wheel and a pair of rear wheels. The rear wheels typically are attached to the frame with a swing arm, which is connected to a rear portion of the frame and which is capable of pivotal movement relative to the frame about a generally horizontal axis. A shock absorber often is disposed between the swing arm and the frame to control movement of the swing arm during operation of the vehicle over rough terrain.

One example of such a swing arm was disclosed in Japanese Patent No. 2535328. FIG. 1 reproduces FIG. 1 of that patent. As illustrated, the swing ann 10 generally comprises an elongated neck portion 12 and a bearing carrying portion 14. A forward end of the elongate neck portion 12 comprises a pivot shaft 16 and a bearing configuration 18 to promote pivotal movement of the swing arm 10 relative to the frame to which the swing arm 10 is attached. A flange 20 is provided along the neck portion 12. The flange 20 provides a connecting location for a shock absorber or damper.

The bearing carrying portion 14 is connected to the rear end of the neck portion 12. In the illustrated arrangement, the bearing carrying portion 14 is comprised of a square tube 22. The square tube 22 generally is welded directly to the neck portion 12 and provides a housing in which an axle 24 of the vehicle is mounted.

Two sets of bearings 26 positioned within a housing having an upper block 28 and a lower block 30 are disposed within the tube 22. A set of four threaded fasteners 32, two of which are shown, are used to secure the housing in position within the tube 22. The threaded fasteners extend through longitudinal slots 34 formed in the top and bottom surfaces of the square tube 22. Thus, the longitudinal position of the axle 24 can be adjusted forward and backward.

A further threaded fastener 36 extends rearward from the rear of the housing and through the square tube. This threaded fastener 36 receives nuts 38 that can be tightened to pull the axle 24 rearward through the bearing carrying portion 14 such that tension is increased to a chain used to drive the rear axle 24.

One drawback to this swing arm construction is that the lateral ends of the square tube are not enclosed. Thus, dust, dirt and other debris can easily become lodged in the tube. Not only does this detract from an otherwise clean vehicle, but the dirt can hamper maintenance and increase wear. For instance, if the chain needs to be slacked, then the dirt must be cleared sufficiently from within the tube to allow the bearings and the associated housing to be moved forward within the tube.

Another drawback to this swing arm construction relates to providing tension to the chain. As can be appreciated, the size of the threaded fastener 36 must be fairly substantial to withstand the loads applied when tensioning the chain. At least two conditions necessitate the increased size. First, only a single member is used to apply the initial tension. Second, the single member is receiving a tensile load under most conditions even though the other threaded fasteners are tightened into position.

SUMMARY OF THE INVENTION

Accordingly, an improved swing arm construction is desired whereby the above-noted drawbacks can be overcome. In addition, the improved construction preferably provides simpler manufacture as well as maintenance.

Accordingly, one aspect of the present invention involves a recreational all terrain vehicle comprising a frame assembly with an engine disposed within the frame assembly. The engine is adapted to power an output shaft and a drive pulley is secured to the output shaft. A swing arm is pivotally connected to the frame assembly with a pair of rear wheels being supported by the swing arm. A pivot axis is defined at a location in which the swing arm is pivotally connected to the frame assembly. The swing arm comprises a forward neck portion and a rearward bearing carrying portion. An axle is connected to the pair of rear wheels with the axle being adapted to rotate about an axle rotational axis. The pivot axis and the axle rotational axis are generally parallel. A driven pulley is connected to the axle with a flexible transmitter extending around the drive pulley and the driven pulley. The bearing carrying portion comprises an outer housing secured to the neck portion. The axle extends through a transverse opening extending through a portion of the outer housing. A pair of plates are positioned on lateral sides of the outer housing and at least partially close the transverse opening. A tubular member extends through the transverse opening and is connected to the pair of plates. A first fastener and a second fastener transversely extend between the pair of plates while the first fastener and the second fastener are adapted to secure the pair of plates to the outer housing.

Another aspect of the present invention involves a swing arm for a recreational all terrain vehicle. The swing arm comprises a neck portion and a bearing carrier portion. The neck portion extends partway into the bearing carrier portion and is secured to the bearing carrier portion. The bearing carrier portion comprises an outer housing with the outer housing defining a transverse opening. A first slot and a second slot also extend transversely through the outer housing and are generally parallel to the transverse opening. A first plate is attached to a first lateral side of the outer housing and a second plate is attached to a second lateral side of the outer housing. A first elongated member extends through the first slot and a second elongated member extends through the second slot. The first plate and the second plate substantially cover the transverse opening and are secured to the outer housing by the first elongated member and the second elongated member.

A further aspect of the present invention involves a recreational all terrain vehicle comprising a frame assembly with an engine disposed within the frame assembly. The engine is adapted to power an output shaft with a drive pulley being secured to the output shaft. A swing arm is pivotally connected to the frame assembly. A pair of rear wheels are supported by the swing arm and a pivot axis is defined at a location in which the swing arm is pivotally connected to the frame assembly. The swing arm comprises a forward neck portion and a rearward bearing carrying portion. An axle is connected to the pair of rear wheels with the axle being adapted to rotate about an axle rotational axis. The pivot axis and the axle rotational axis are generally parallel. A driven pulley is connected to the axle with a flexible transmitter extending around the drive pulley and the driven pulley. The neck portion extends partway into the bearing carrying portion and is secured to the bearing carrier portion. The bearing carrying portion comprises an outer housing that defines a transverse opening. A first slot and a second slot also extend transversely through the outer housing and are generally parallel to the transverse opening. The axle extends through the transverse opening. A pair of plates are positioned on opposing lateral sides of the outer housing. A first elongated member and a second elongated member extend through the first slot and the second slot respectively and the pair of plates substantially cover the transverse opening. The pair of plates are secured to the outer housing by the first elongated member and the second elongated member.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

BRIEF DESCRIPTION OF THE DRAWINGS

These and other features, aspects and advantages of the present invention will be described with reference to accompanying drawings. The drawings comprise six figures.

DETAILED DESCRIPTION OF THE PREFERRED EMBODIMENTS

Figure 1:
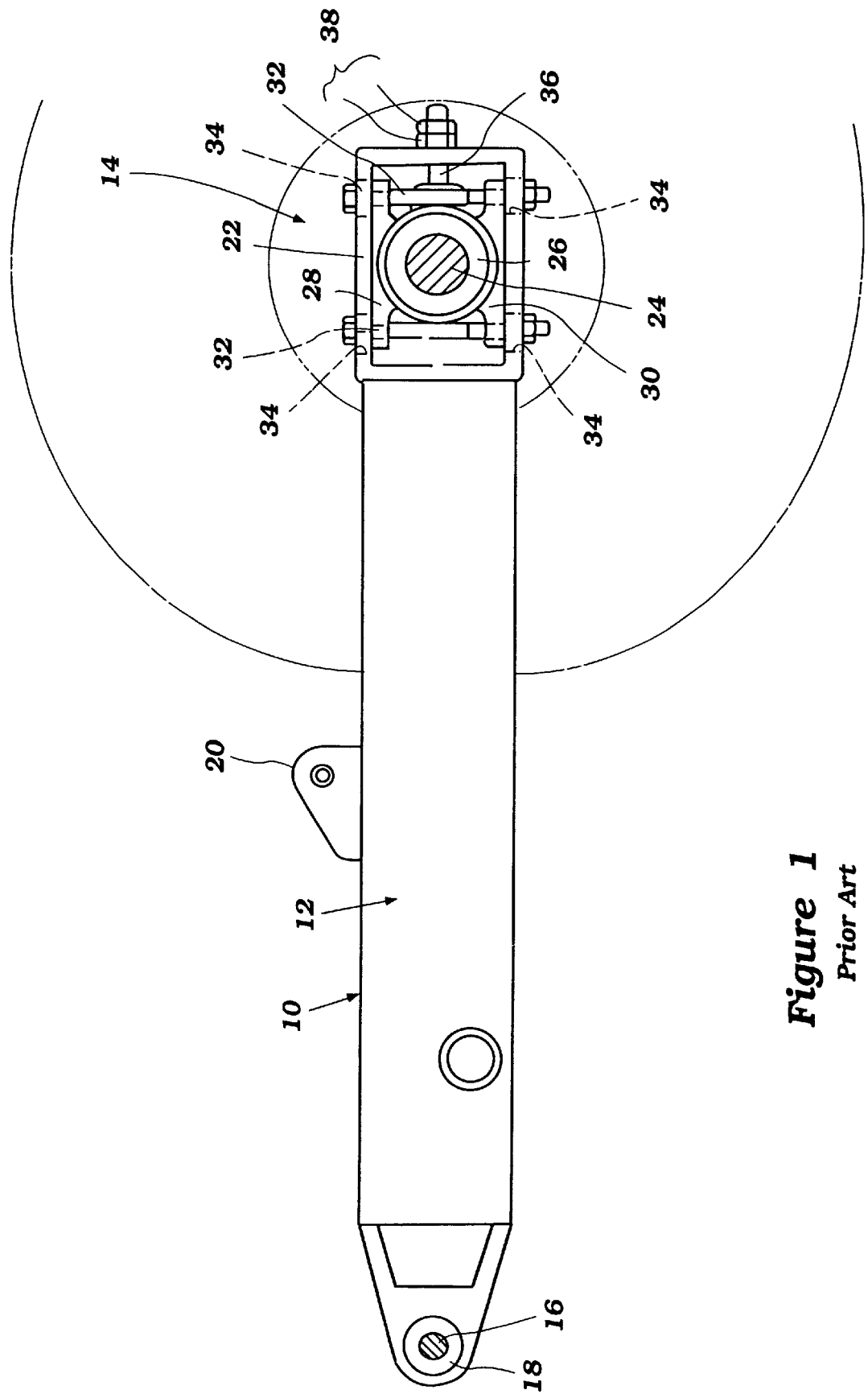
FIG. 1 is a side elevation view of a prior swing arm construction with the axle being shown in section.
Figure 2:
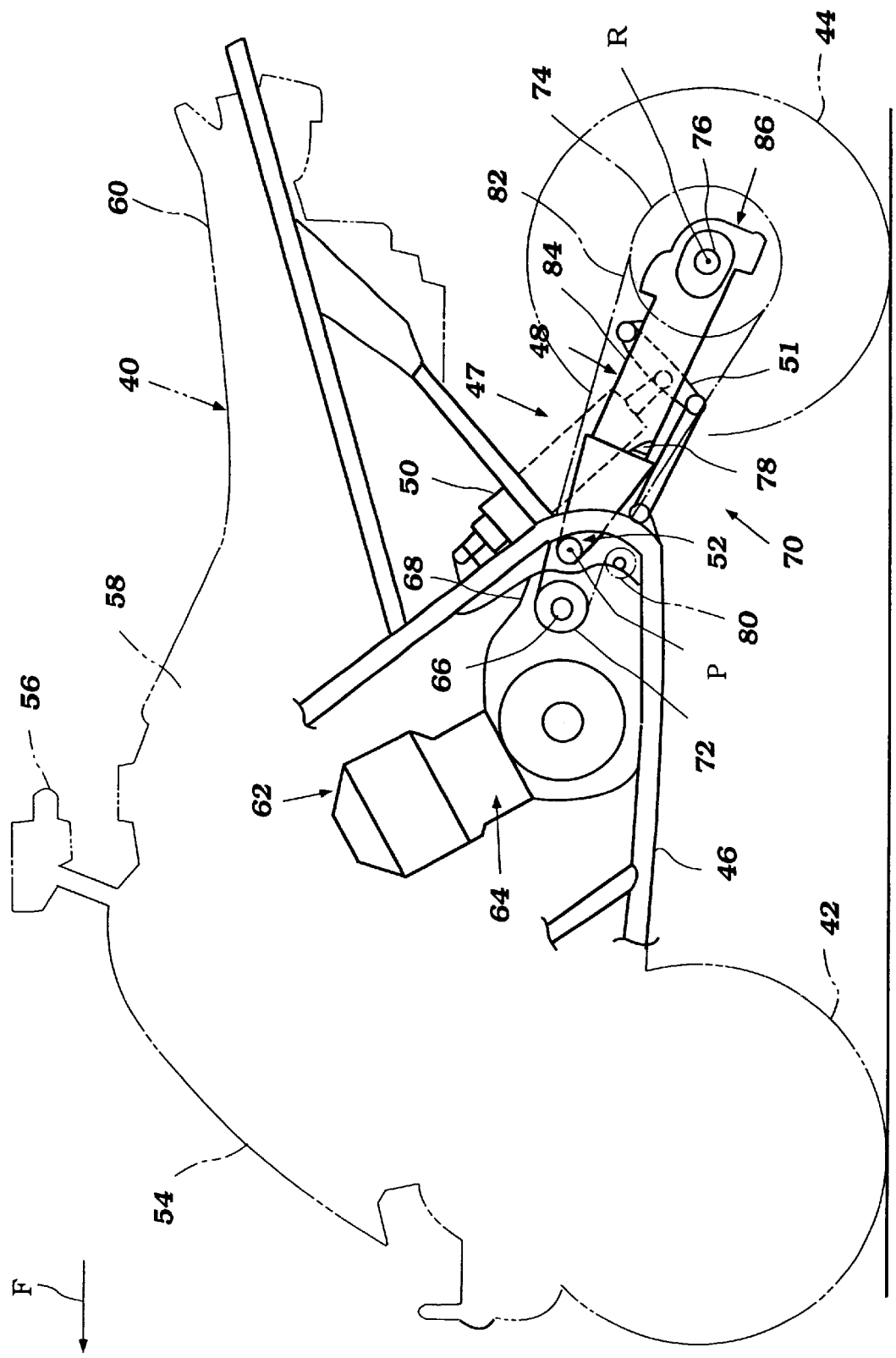
FIG. 2 is a simplified side elevation view of an all terrain vehicle having a swing arm arranged and configured in accordance with the present invention. Certain features of the vehicle are outlined in phantom and an arrow labeled "F" is provided to show the forward direction.
Figure 3:
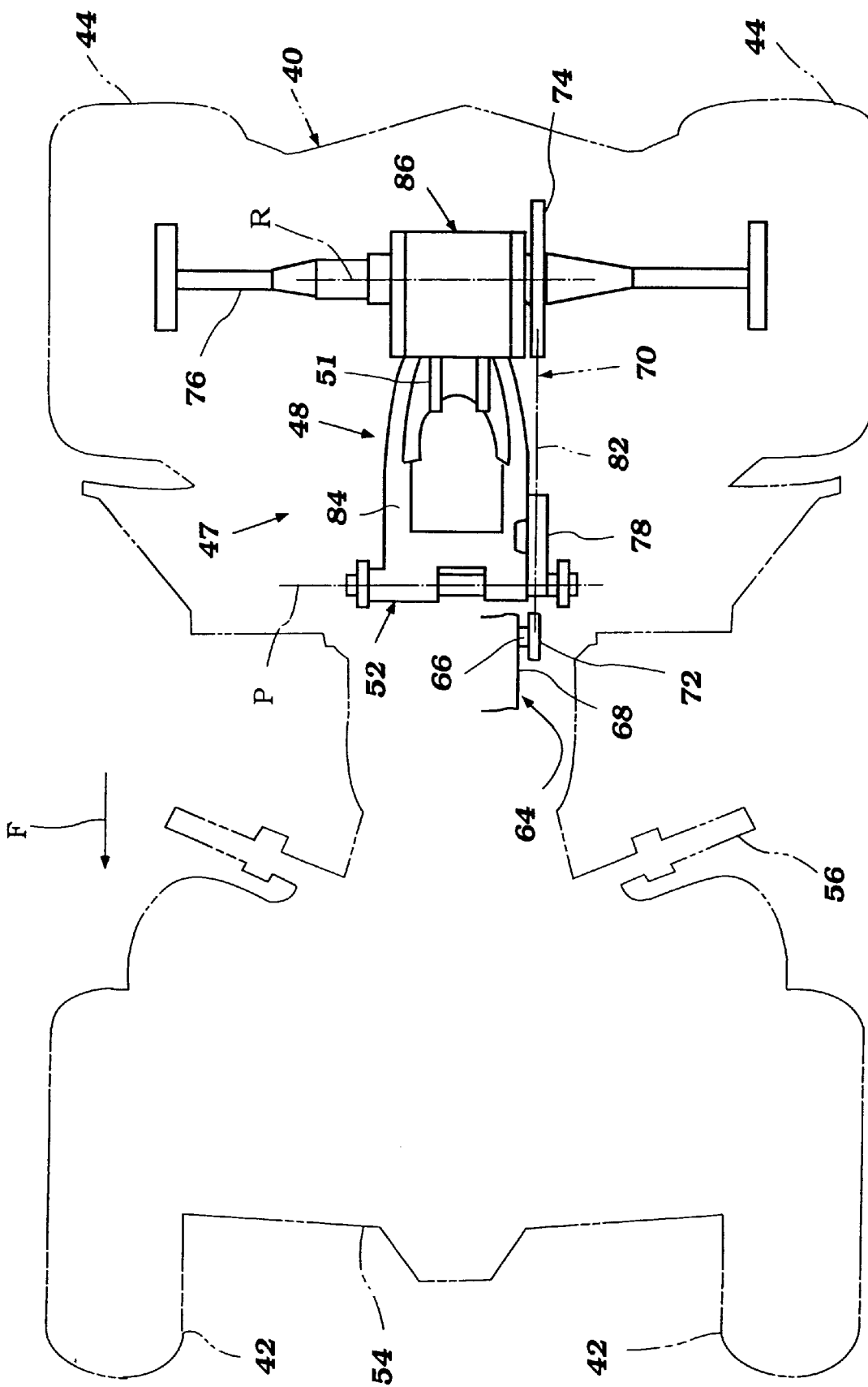
FIG. 3 is a simplified top plan view of the vehicle of FIG. 2. Certain features of the vehicle are outlined in phantom and an arrow labeled "F" is provided to show the forward direction.

With reference initially to FIGS. 1 and 2, an all terrain vehicle having a swing arm arranged and configured in accordance with certain features, aspects and advantages of the present invention is illustrated therein. While the swing arm will be described in the context of a four wheeled all terrain vehicle, other vehicles also can employ certain features, aspects and advantages of the present invention. For instance, vehicles having a belt driven or chain driven rear wheel can benefit from certain features of the present invention. Thus, vehicles such as motor scooters, lawn mowers, go carts and the like can benefit from some of the features of the present invention. In addition, vehicles employing swing arms similar to that disclosed can benefit from certain features of the present invention.

With continued reference to FIGS. 1 and 2, the illustrated vehicle 40 generally comprises a pair of front wheels 42 and a pair of rear wheels 44. The dirigible front wheels 42 carry a forward portion of a frame assembly 46. The rear wheels 44 are connected to the frame assembly 46 by a suspension system 47 that includes the swing arm 48. With the assistance of a shock absorber 50 and an attached two bar linkage 51, the swing arm 48 supports a rear portion of the illustrated frame assembly 46. The swing arm 48 is connected to the frame assembly 46 at a pivot axis P by a pivot shaft 52. In the illustrated arrangement, the pivot axis P is forward of a rear elbow of the frame assembly (i.e., disposed within the frame assembly); however, in other arrangements, the pivot axis P may be positioned rearward of the frame assembly (i.e., disposed outside of the frame assembly).

The frame assembly 46 supports a number of body components of the vehicle 40. For instance, a forward fender assembly 54 can be positioned over the dirigible front wheels 42. The fender assembly 54 preferably includes a forward cowling that wraps rearward around a portion of a steering handle arrangement 56. The steering handle arrangement 56 is operably connected to the front wheels 42 to steer the front wheels in a known manner.

Rearward of the illustrated steering handle arrangement, a fuel tank 58 and a seat 60 are supported by the frame assembly 46 in any suitable manner. The frame assembly 46 also defines an engine compartment 62 within which an engine 64 is mounted in a suitable manner. An output shaft 66 that is driven by the engine 64 is disposed generally forward of the pivot axis P in the illustrated arrangement. Preferably, the output shaft 66 is disposed within a transfer case 68 and is driven by a transmission that is also contained at least in part within the transfer case 68.

The rear wheels 44 preferably are driven by the rotational power output from the output shaft 66. In the illustrated arrangement, the output shaft 66 drives the rear wheels 44 through a chain drive 70; however, belt drives and other suitable driving configurations also can be used. As illustrated, the output shaft 66 carries a drive sprocket 72. The drive sprocket 72 powers a driven sprocket 74 that is connected to an axle 76 of the rear wheels 44. The driven sprocket 74 and the rear axle 76 preferably rotate about a rear axis of rotation R.

It should be mentioned that, in the case of independently suspended rear wheels, the driven sprocket 74 can be connected to the associated constant velocity joints in any suitable manner. Preferably, a chain guide 78 and a tensioning roller 80 also are provided. The chain guide reduces wear on the chain and maintains accurate loading of the chain onto the drive sprocket 72 while the tensioning roller 80 helps remove slack created during movement of the swing arm 48 relative to the frame assembly 46. Moreover, while implicit in the above-discussion, the chain drive 70 also includes a roller chain 82, or any other suitable, flexible and endless transmitter.

As discussed above, the swing arm 48 preferably comprises a neck portion 84 and a bearing carrying portion 86. The neck portion 84 extends rearward to the bearing carrying portion 86. Thus, the neck portion 84 is pivotally attached to the frame assembly 46 and the bearing carrying portion 86 supports the axle 76 for rotation. Of course, the bearing carrying portion 86 allows adjustment of the axle location relative to the frame assembly 46 such that the distance between the pivot axis P and the rotational axis R can be adjusted to increase or decrease the tension on the stationary chain drive 70.

Figure 4:
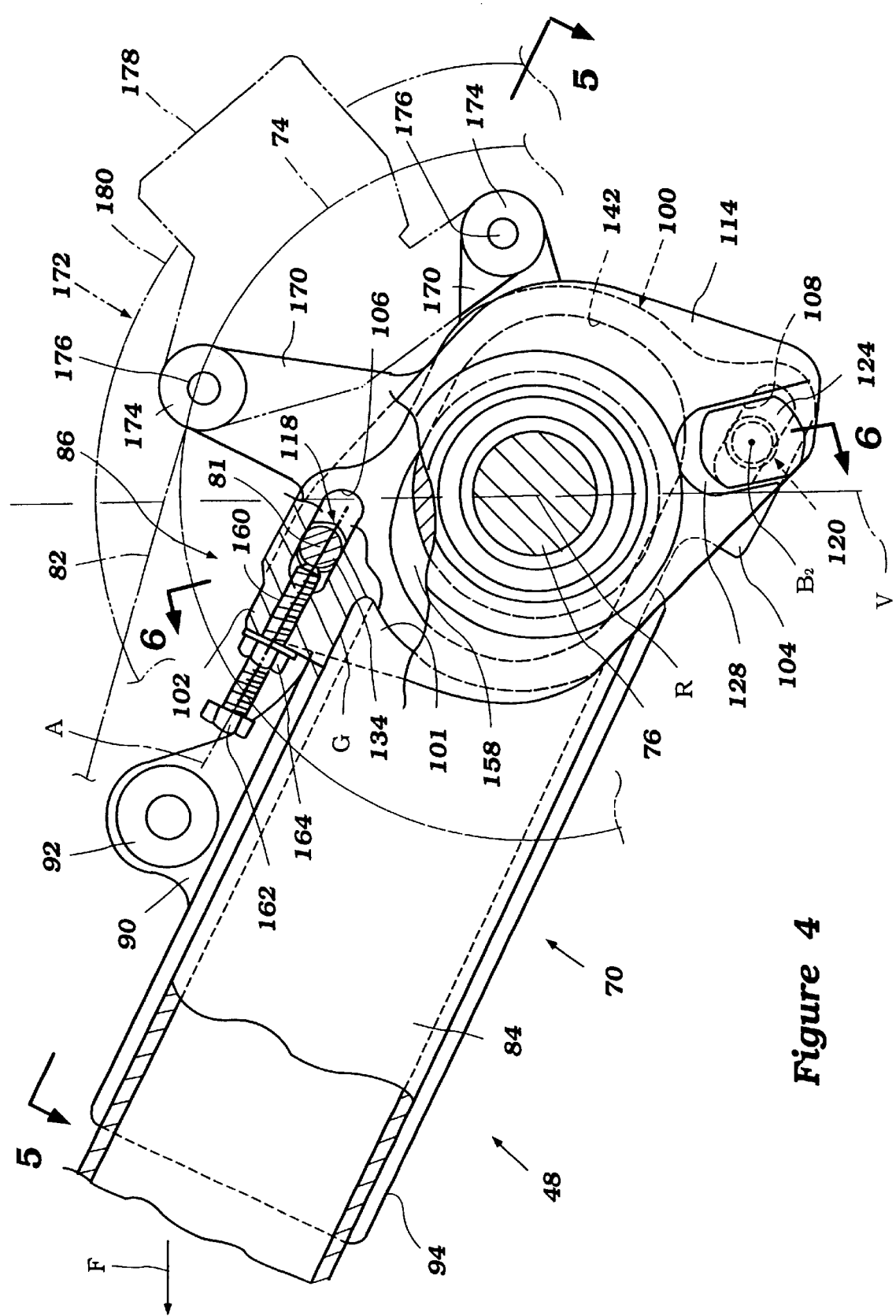
FIG. 4 is an enlarged partially sectioned side elevation view of a rear portion of a swing arm used in the vehicle of FIG. 2.
Figure 5:
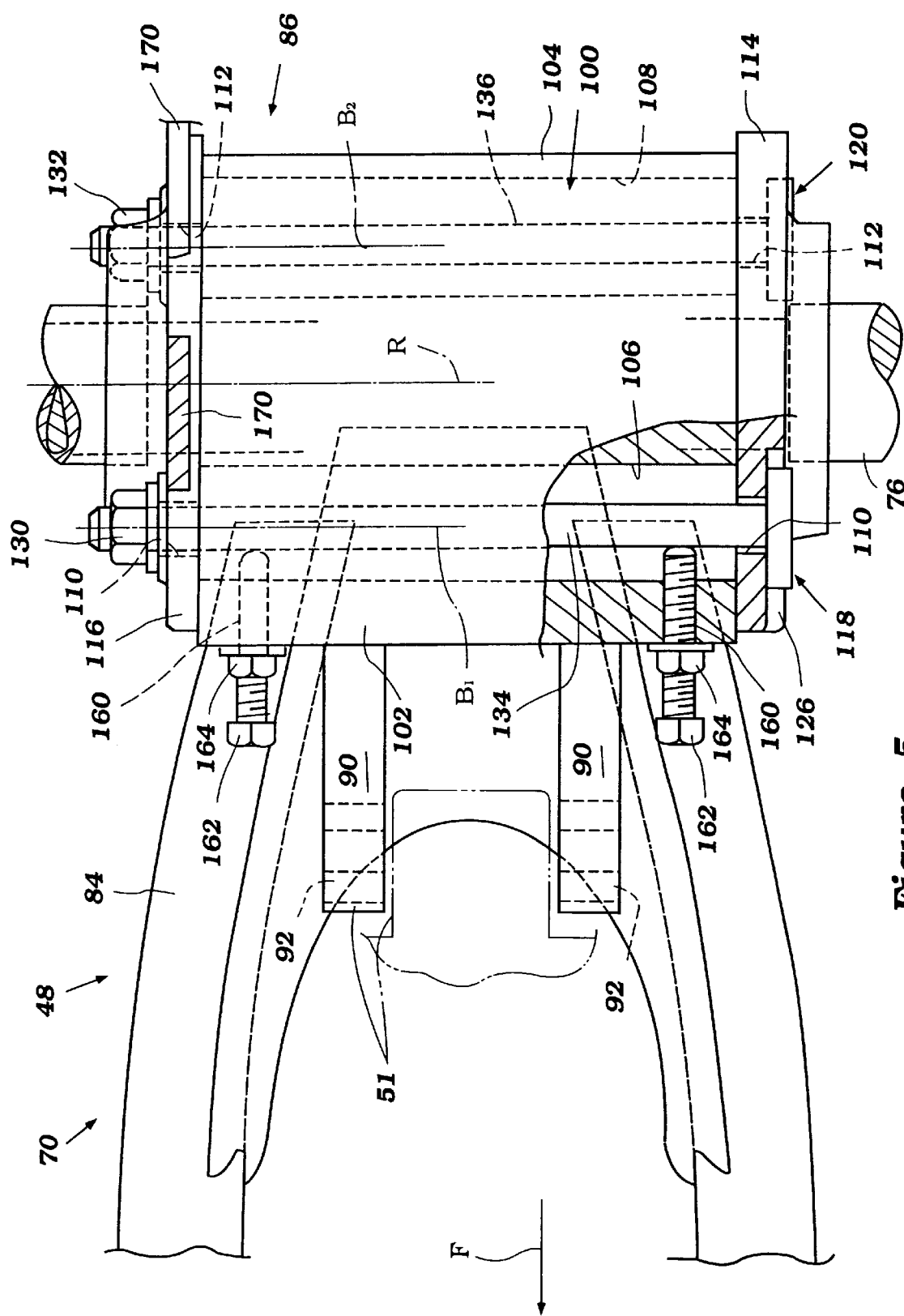
FIG. 5 is an enlarged top plan view of the portion of the swing arm shown in FIG. 4 taken along the line 5—5 in FIG. 4.

With reference now to FIGS. 4 and 5, the illustrated linkage 51 is connected to the swing arm at a pair of pivot locations. In the illustrated configuration, the linkage 51 extends through an opening formed in the neck portion 84 of the swing arm 48 just forward of the bearing carrying portion 86. The linkage 51 is connected to the swing arm 48 at a pair of mounted bosses 90. The mounting bosses 90 contain suitable bearing or bushing arrangements 92 and are reinforced rearward of the pivot axis defined through the bearing or bushing arrangements 92. The reinforcement helps solidify the mounting bosses 90 and helps to reduce the likelihood of fractures along this load bearing portion of the swing arm 48. Furthermore, in the illustrated arrangement, the mounting bosses 90 extend outward from a sleeve 94, which encases a substantial portion of the rear end of the swing arm 48. The sleeve 94 further stiffens the load bearing portion of the swing arm 48 and provides a reinforcing location to which the bearing carrying portion 86 can be mounted, in a manner that will now be described.

Figure 6:
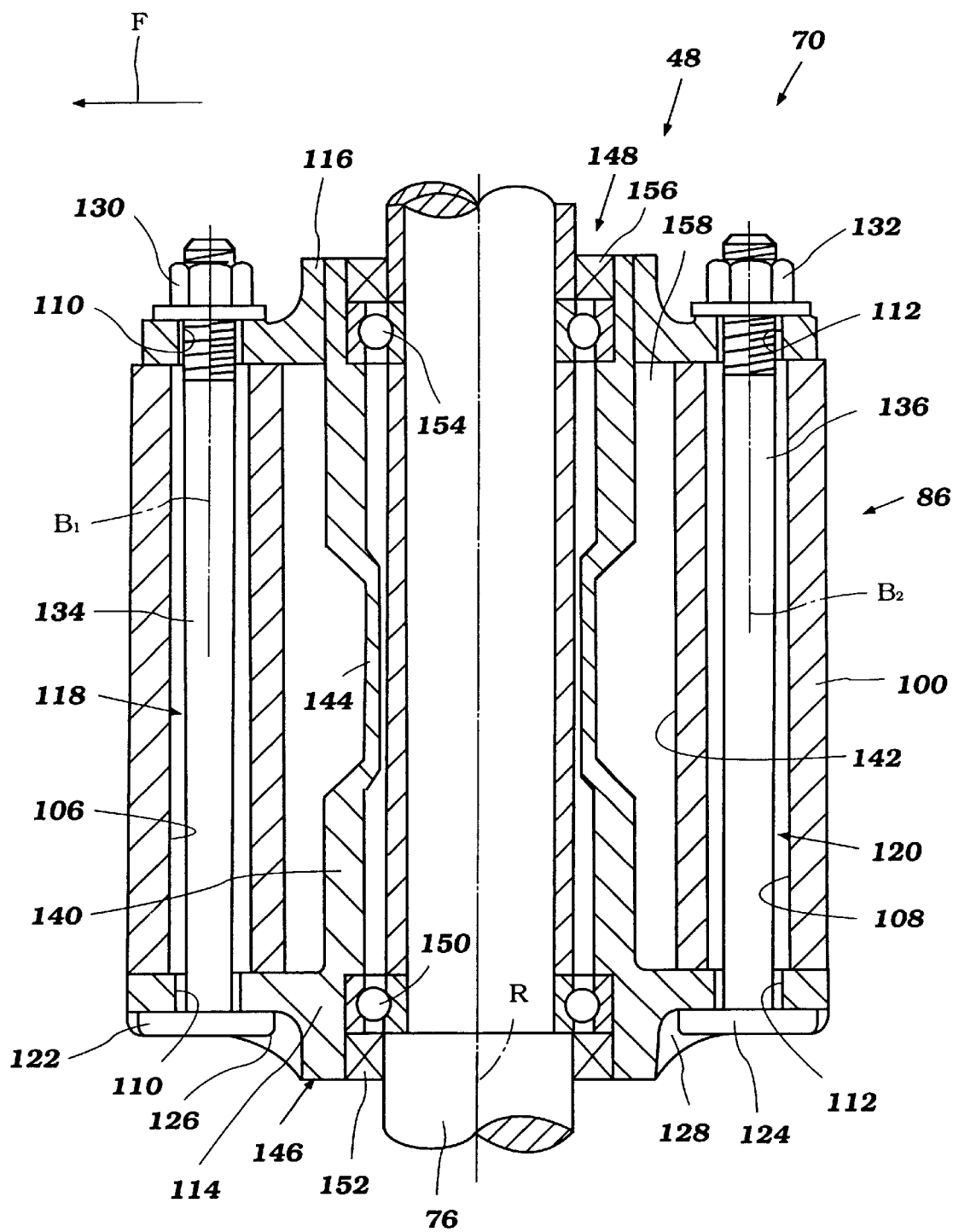
FIG. 6 is a sectioned view of the portion of the swing arm shown in FIG. 4 taken along the line 6—6 in FIG. 4.

With reference now to FIGS. 4–6, a presently preferred construction of the bearing carrying portion 86 will be described in greater detail. In the illustrated arrangement, the bearing carrying portion 86 comprises an outer housing 100. The outer housing 100 preferably is cylindrical in configuration as this configuration helps to reduce stress-risers within the construction. Of course, depending upon the material selection and the chosen configuration, other outer housing shapes can be used.

In addition, the connection between the outer housing 100 and a rear portion 101 of the swing arm 48 is advantageously reinforced due to the technique in which the two components are attached. In particular, with reference to FIG. 4, the sleeve 94 has a rear face that is terminated short of the rear end of the swing arm 48. Thus, in the illustrated arrangement, the swing arm 48 extends through the sleeve 94. The swing arm and the sleeve are contoured to receive the outer housing 100. In addition, the outer housing further comprises an upper lug 102. In particular, in the illustrated arrangement, the upper lug 102 has a lower surface that interfaces with the swing arm 48 while the forward end of the upper lug 102 contacts the end of the sleeve 94. In some configurations, such as in the illustrated arrangement, a gap G is positioned between a portion of the upper lug 102 and the swing arm 48. Thus, the rear portion 101 of the swing arm 48 can have an increased weld line to increase the strength of the connection between the neck portion 84 and the bearing carrying portion 86.

With continued reference to FIG. 4, the outer housing 100 also comprises a lower lug 104. The lower lug 104 extends downward and rearward while the upper lug 102 extends upward and forward from a main portion of the outer housing 100. Formed within the illustrated upper lug 102 is a first longitudinal slot 106 and formed within the illustrated lower lug 104 is a second longitudinal slot 108. While the illustrated slots 106, 108 are aligned with each other and extend along generally parallel major axes, the slots could be slightly skewed relative to each other. Advantageously, when arranged in parallel, the slots 106, 108 allow easy adjustment of the axle 76 in a longitudinal direction.

With reference now to FIG. 5, the slots 106, 108 extend through the lugs 102, 104 of the outer housing 100. The slots 106, 108 align with openings 110, 112 formed in a pair of outer plates 114, 116 respectively. The outer plates 114, 116 comprise a left plate 114 and a right plate 116 in the illustrated arrangement. As will be appreciated, the nomenclature of left and right is for easy of reference as the plates can be interchanged in varied applications. Preferably, the openings 110, 112 are circular, however. By forming the openings 110, 112 in a circular configuration rather than slots, the increased surface friction between the plates 114, 116 and the outer housing 100 can be used, at least in part, to secure the plates in position. The friction, of course, is increased due to the increased contact area.

The friction is caused when a first bolt 118 and a second bolt 120 are drawn tight with the plates and the outer housing positioned between opposing faces of each bolt 118, 120. While bolts are used in the illustrated arrangement, other threaded fasteners also can be used. Moreover, other mechanical components that place intervening members in compression while being placing at least a portion of the mechanical component in tension also can be used.

In the illustrated arrangement, the bolts 118, 120 each comprises an elongated head portion 122, 124. Each head portion 122, 124 is received within a respective slotted opening 126, 128 formed within the plates 114, 116. As illustrated, this recess preferably does not extend completely through the plate such that the plates can be secured by the bolts 118, 120. In addition, a washer and nut assembly 130, 132 preferably is disposed on the opposing end of the bolts 118, 120 respectively. Furthermore, a shank 134, 136 of each bolt 118, 120 preferably extends through the respective slot 106, 108 and each shank 134, 136 is rotatable about a separate bolt axis B1, B2.

With particular reference now to FIG. 6, the two plates 114, 116 will be described in more detail. As illustrated, the left plate 114 comprises a generally tubular extension 140. The extension 140 preferably is sized and configured to extend through an opening 142 defined within the outer housing 100 between the slots 106, 108. The illustrated extension 140 extends through the outer housing 100 and through the right plate 116 for reasons that will become apparent. In addition, the illustrated extension has a necked-down portion 144 proximate a center of the outer housing 100. The necked-down portion 144 places an inner wall of the extension 140 in closer proximity to the outside surface of the axle 76 in this location.

Additionally, the extension 140 comprises a proximal end 146 and a distal end 148. The proximal end 146 has an outer portion, which is adjoined with the plate surface 114 in the illustrated arrangement, that is counterbored to receive a bearing 150 and a seal 152. The distal end of the sleeve also is counterbored to receive a bearing 154 and a seal 156. The bearings 150, 154 journal the axle 76 and the seals reduce or eliminate dirt infiltration into the extension 140. In some arrangements, a bushing or sleeve can encase the axle 76 to reduce wear between the inner wall of the extension 140 and the axle 76.

The illustrated arrangement, thus, defines an enclosed chamber 158 that is substantially sealed from the elements, such as dirt, dust and the like. Furthermore, this chamber 158 accommodates relative movement of the axle 76 during adjustment of chain tension. During adjustment, the plates 114, 116 move relative to the housing 100; however, the movement of the plates 114, 116 preferably does not result in large openings into the inner chamber 158. Therefore, the inner chamber 158 does not collect mud, dirt and dust and the appearance of the vehicle, when hosed off after riding, is improved. Furthermore, the inner chamber remains substantially free of movement-blocking materials such that adjustment can be readily made in a manner which will not be described.

With reference again to FIGS. 4 and 5, a pair of apertures 160 are formed in the upper lug 102. The apertures 160 preferably define central axes A that extend generally through the bolt 118. More preferably, the axes A extend through the shank 134 of the bolt 118. Most preferably, the apertures 160 define central axes A that extend generally normal to the bolt 118 and that extend through the centerline of the bolt B1. In addition, the axes A preferably are parallel to the major axis of the slot 106 and more preferably are aligned with a plane extending through the slot 106 along the major axis of the slot 106.

A threaded member, such as a bolt 162, is threadedly engaged within each aperture 162. In some configurations, a threaded insert, a weld-nut or the like can be disposed in an appropriate location relative to each of the apertures 160. The bolt 162, therefore, can be turned into and out of the upper lug 102. By turning the bolts 162 into the lug 102, the bolts 162 act against the bolt 118. Thus, the bolt can push the bolt 118 outward to tension the chain. While the illustrated arrangement features two bolts 162 that are symmetrically arranged, a single bolt and more than two bolts can be used. Additionally, while symmetry is desired, an asymmetric pattern also can be used depending upon the application. In addition, each bolt 162 receives a lock nut 164. The lock nut 164 can be used to fix the position of the bolt 162 relative to the lug 102 when the appropriate chain tension has been achieved. The lock nut 164 advantageously reduces the likelihood that the bolt 162 will loosen over time due to vibrations resonating in the frame assembly 64.

With reference still to FIGS. 4 and 5, the right plate 116 also comprises a pair of outwardly extending ears 170 that serve as mounts for a portion of a brake assembly 172. Each of the ears 170 contains a mounting boss 174 that receives a fastener 176. The fasteners 176 secure a brake caliper 178 in position relative to the swing arm 48. As is known, the brake caliper squeezes a brake disc 180 that is fastened to the axle 76 in any suitable manner. The squeezing of the brake 180, which is typically rotating counterclockwise in FIG. 4 during forward movement of the vehicle, slows the rotation of the axle 76 and brings the vehicle to a stop.

As can be appreciated, the positioning of the caliper places a large moment on the bearing carrying portion 86 and particularly on the joint between the bearing carrying portion 86 and the neck portion 84. Additionally, the moment acts against the bolt 162. Advantageously positioned, the bolt 162 receives compressive loading rather than tensile loading (which is received by the threaded member in the prior arrangement illustrated in FIG. 1).

Additionally, with reference to FIG. 4, a plane passing through the centers of the bolts 118, 120 extends at an angle to a vertical plane V extending through the axle 76. Preferably, the upper portion of the plane, which coincides with the plane 6—6, that is above the axle 76 is forward of the axle. More preferably, this plane intersects the rotational axis R of the rear axle 76. In this manner, the loading created during breaking, which includes a moment created in the upper rear portion of the brake disc 180, is effectively countered.

Furthermore, the slots are preferably positioned such that the bolts 118, 120 are generally positioned on opposing sides of the vertical axis. While in the illustrated arrangement, some portion of the upper bolt 118 may extend rearward of the vertical plane V, the upper bolt 118 preferably is always forward of the generally vertical plane V.

In use, the bolts 118, 120 can be loosened. With these bolts 118, 120 loosened, the bolts 162 can be used to urge the pivot axis P away from the rear axle rotational axis R or can be retracted such that the tension on the chain can be reduced. When the bolts 162 are retracted, the tension forces on the chain will draw the axle forward. When the chain has been appropriately tensioned, such as by adjusting the bolts 162, the transverse bolts 118, 120 can be tightened. With the transverse bolts 118, 120 tightened, the chain tension is then fixed. Adjustment can be made as desired or necessary over time.

Although the present invention has been described in terms of a certain embodiment, other embodiments apparent to those of ordinary skill in the art also are within the scope of this invention. Thus, various changes and modifications may be made without departing from the spirit and scope of the invention. For instance, various components may be repositioned as desired. Moreover, not all of the features, aspects and advantages are necessarily required to practice the present invention. Accordingly, the scope of the present invention is intended to be defined only by the claims that follow.

What is claimed is:

1. A recreational all terrain vehicle comprising a frame assembly, an engine disposed within said frame assembly, said engine adapted to power an output shaft, a drive pulley secured to said output shaft, a swing arm pivotally connected to said frame assembly, a pair of rear wheels supported by said swing arm, a pivot axis being defined at a location in which said swing arm is pivotally connected to said frame assembly, said swing arm comprising a forward neck portion and a rearward bearing carrying portion, an axle being connected to said pair of rear wheels, said axle adapted to rotate about an axle rotational axis, said pivot axis and said axle rotational axis being generally parallel, a driven pulley being connected to said axle, a flexible transmitter extending around said drive pulley and said driven pulley, said bearing carrying portion comprising an outer housing secured to said neck portion, said axle extending through a transverse opening extending through a portion of said outer housing, a pair of plates positioned on lateral sides of said outer housing and at least partially closing said transverse opening, a tubular member extending through said transverse opening and being connected to said pair of plates, a first fastener and a second fastener transversely extending between said pair of plates and said first fastener and said second fastener being adapted to secure said pair of plates to said outer housing.

2. The vehicle of claim 1, wherein said plates are adapted for longitudinal movement relative to said outer housing when said first and second fasteners are loosened.

3. The vehicle of claim 2, wherein at least one elongated member extends through a portion of said outer housing and contacts at least one of said first fastener and said second fastener.

4. The vehicle of claim 3, wherein said at least one elongated member comprises an externally threaded portion.

5. The vehicle of claim 3, wherein said plates are moved by inserting and retracting said at least one elongated member into and out of said outer housing.

6. The vehicle of claim 1, wherein said first fastener is positioned above said second fastener and said first fastener is positioned forward of said second fastener.

7. The vehicle of claim 6, wherein said axle rotational axis is disposed between said first fastener and said second fastener.

8. The vehicle of claim 6, wherein a threaded member is threadedly engaged with said outer housing, is rotatable about an axis that extends through said first fastener and is capable of contacting said first fastener.

9. The vehicle of claim 8, wherein said axis of said threaded member extends through a rotational axis of said first fastener.

10. The vehicle of claim 8, wherein said first fastener extends within a transversely disposed slot having a major axis, said axis of said first fastener being generally aligned with said major axis.

11. The vehicle of claim 1, wherein said outer housing comprises an upper lug, said upper lug extending above a portion of said neck portion of said swing arm and said upper lug being secured to said portion of said neck portion.

12. The vehicle of claim 11, wherein a threaded member extends through at least a portion of said upper lug and contacts said first fastener.

13. The vehicle of claim 1 further comprising a brake caliper, said brake caliper being supported by said swing arm.

14. The vehicle of claim 13, wherein said brake caliper is supported by said outer housing.

15. The vehicle of claim 14, wherein said brake caliper is supported by an upper rear portion of said outer housing.

16. A swing arm for a recreational all terrain vehicle comprising a neck portion and a bearing carrier portion, said neck portion extending partway into said bearing carrier portion and being secured to said bearing carrier portion, said bearing carrier portion comprising an outer housing, said outer housing defining a transverse opening, a first slot and a second slot also extending transversely through said outer housing and being generally parallel to said transverse opening, a first plate being attached to a first lateral side of said outer housing and a second plate being attached to a second lateral side of said outer housing, a first elongated member extending through said first slot and a second elongated member extending through said second slot, said first plate and said second plate substantially covering said transverse opening and being secured to said outer housing by said first elongated member and said second elongated member.

17. The swing arm of claim 16, wherein said first elongated member and said second elongated member comprise bolts.

18. The swing arm of claim 16, wherein said outer housing further comprises an upper lug disposed in a forward location of said bearing carrier portion and above at least a portion of said neck portion, a threaded member extending through said upper lug and contacting said first elongated member.

19. The swing arm of claim 18, wherein said threaded member comprises an axis of rotation, said first slot comprises a first major axis and said axis of rotation extends along said first major axis.

20. The swing arm of claim 19, wherein said second slot comprises a second major axis, said second major axis being generally parallel to said first major axis.

21. The swing arm of claim 16, wherein said first elongated member is disposed generally forward of and above said second elongated member.

22. The swing arm of claim 21 further comprising a mounting arrangement adapted to receive a brake caliper.

23. The swing arm of claim 22, wherein said mounting arrangement is disposed rearward of said first elongated member.

24. The swing arm of claim 16 in combination with a recreational all terrain vehicle, said all terrain vehicle comprising a frame assembly, an engine disposed within said frame assembly, said engine adapted to power an output shaft, a drive pulley secured to said output shaft, said swing arm pivotally connected to said frame assembly, a pair of rear wheels supported by said swing arm, a pivot axis being defined at a location in which said swing arm is pivotally connected to said frame assembly, an axle being connected to said pair of rear wheels, said axle adapted to rotate about an axle rotational axis, said pivot axis and said axle rotational axis being generally parallel, a driven pulley being connected to said axle, a flexible transmitter extending around said drive pulley and said driven pulley.

25. A recreational all terrain vehicle comprising a frame assembly, an engine disposed within said frame assembly, said engine adapted to power an output shaft, a drive pulley secured to said output shaft, a swing arm pivotally connected to said frame assembly, a pair of rear wheels supported by said swing arm, a pivot axis being defined at a location in which said swing arm is pivotally connected to said frame assembly, said swing arm comprising a forward neck portion and a rearward bearing carrying portion, an axle being connected to said pair of rear wheels, said axle adapted to rotate about an axle rotational axis, said pivot axis and said axle rotational axis being generally parallel, a driven pulley being connected to said axle, a flexible transmitter extending around said drive pulley and said driven pulley, said neck portion extending partway into said bearing carrying portion and being secured to said bearing carrier portion, said bearing carrying portion comprising an outer housing that defines a transverse opening, a first slot and a second slot also extending transversely through said outer housing and being generally parallel to said transverse opening, said axle extending through said transverse opening, a pair of plates positioned on opposing lateral sides of said outer housing, a first elongated member and a second elongated member extending through said first slot and said second slot respectively and said pair of plates substantially covering said transverse opening and being secured to said outer housing by said first elongated member and said second elongated member.

* * * * *